(12) United States Patent
Knox et al.

(10) Patent No.: US 6,448,928 B1
(45) Date of Patent: Sep. 10, 2002

(54) GPS FOR WORKSTATIONS

(75) Inventors: Andrew Ramsay Knox, Kilbirnie; Robert Gordon Harper, Glasgow, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,711

(22) Filed: Aug. 5, 1999

(30) Foreign Application Priority Data

Mar. 27, 1999 (GB) .............................. 9907001

(51) Int. Cl.⁷ ........................... G01S 5/02; H04B 7/185
(52) U.S. Cl. ............... 342/357.09; 342/357.1; 455/456
(58) Field of Search ................. 342/357.09, 357.1; 455/456

(56) References Cited

U.S. PATENT DOCUMENTS

| 5,389,934 A | | 2/1995 | Kass | |
|---|---|---|---|---|
| 5,790,800 A | * | 8/1998 | Gauvin et al. | 395/200.57 |
| 6,047,327 A | * | 4/2000 | Tso et al. | 709/232 |
| 6,091,959 A | * | 7/2000 | Souissi et al. | 455/456 |
| 6,148,179 A | * | 11/2000 | Wright et al. | 455/66 |

FOREIGN PATENT DOCUMENTS

| EP | 0899648 A2 | 3/1999 |
|---|---|---|
| JP | 7248849 | 9/1995 |
| WO | WO97/14054 | 10/1996 |

* cited by examiner

*Primary Examiner*—Theodore M. Blum
(74) *Attorney, Agent, or Firm*—Bracewell & Patterson, LLP; Carlos Munoz-Bustamante

(57) ABSTRACT

A computer system includes a communication means for connection to a remote computer and a position determination system for determining the physical position of the computer system. The communications means receives a request from the remote computer for the computer system to provide the physical position of the computer to the remote computer system via the communications means. The request from the remote computer may originate because the computer system has been stolen or mislaid by a user or it may originate because the computer system has inadvertently been allocated the same network identifier as another computer and the physical location of the computer system needs to be known so that the network identifier can be changed.

16 Claims, 2 Drawing Sheets

GPS FOR WORKSTATIONS

FIELD OF THE INVENTION

The present invention relates in general to the integration of a Global Positioning System or similar device with a computer system, and in particular to the location of a stolen or missing computer system or to the location of computer systems which have been allocated the same network address.

BACKGROUND OF THE INVENTION

A position determining system, referred to as the Global Positioning System (GPS), has a multitude of satellites orbiting approximately 11,000 miles above the earth's surface which are used to enable the position of a compatible receiver to be located relative to the earth. There are eight orbiting satellites in each of three sets of orbits giving twenty-four satellites in total. The longitude, latitude and altitude of any point close to earth, with respect to the centre of the earth, is calculated by determining the propagation time of signals from at least four of the satellites to the point.

U.S. Pat. No. 5,389,934 discloses a portable tracking system that includes one or more portable units for determining their respective locations and communicating it to another unit or to a remote telephone unit. Each unit includes a global positioning system GPS for determining latitude and longitude, a micro-computer, a cellular telephone, and a digital data to voice for converter and batteries.

U.S. Pat. No. 5,835,377 discloses a method and system for optimized material movement within a computer based manufacturing system utilizing global positioning systems. A tracking module which includes a wireless communication device, such as a cellular telephone chip set, and a position determination system, such as a global positioning receiver chip set, is built into each shipping container, vehicle or the like which is utilized to transport material for a computer based manufacturing system. The source and itinerary for each shipment of material, as well as a manufacturing schedule, are then loaded into the computer system which controls the manufacturing system. Periodically, the location of each shipment is then determined by querying the tracking module for a current actual location which is then compared within the computer system with a planned location, determined from the stored itinerary for that shipment. Variations in location of a selected shipment which exceed a specified amount are then utilized to initiate a variation in the manufacturing process, issue alternate shipment orders or initiate the selection of an alternate source for the material within that shipment.

As portable computers such as laptop and notebook computers have become more popular and more powerful, they have become increasingly attractive targets for theft including in the workplace of the computer's user. Portable computers, such as the ThinkPad laptop from IBM Corporation, are designed to be easily portable and it is this characteristic which also makes them easy to steal (ThinkPad and IBM are trademarks of IBM Corporation). The main factors which make them so easy to steal is that they are relatively small and can be easily concealed in a briefcase, bag or simply carried under the arm. This results in office theft of a portable computer being much simpler than larger equipment such as personal computers.

As such thefts have become more common and more costly, an assortment of devices and systems have been proposed for securing portable computers from theft. Solutions such as password protection on BIOS, hard drive and operating system have been implemented. However, these do not provide a means for identifying the location of the portable computer after the theft has taken place.

More and more computers are being connected to networks in which they are each given an individual, unique address, such as a Transmission Control Protocol-Internet Protocol (TCP/IP) address. The idea is that the address is unique and that any communications on the network sent to that address will be responded to by only a single computer on the network which has been allocated the unique address. In the event that two computers are allocated the same address, the users of both computers having the address will experience significant difficulties in using their respective computers. Until one or other of the computers has been identified and the addressed changed so as to restore the uniqueness of the address, the usage of both computers is limited. Whilst it is possible to determine which section of a network a computer with a given unique address is connected to, in large installations this section of the network may cover an area of half a mile or more and include perhaps one or more thousands of computers.

So it would be desirable to provide a way in which the location of a computer could be tracked and the location of the computer found.

SUMMARY OF THE INVENTION

Accordingly, the present invention provides a computer system comprising: communication means for connection to a remote computer; a position determination system for determining the physical position of the computer system; wherein the communications means receives a request from the remote computer for the computer system to provide the physical position of the computer to the remote computer system via the communications means.

The present invention allows a computer system to be interrogated as to its physical location. This may be used, for example, if the computer is mislaid or stolen or when the computer has inadvertently been given the same network identifier as another computer on the network.

In a first embodiment, the communications means comprises a cellular telephone communications device. This allows the computer to be interrogated as to its position, for example, in the event of theft of the computer or if the computer is mislaid.

In a second embodiment, the connection to a remote computer is a network and the request from the remote computer is sent using the network to a computer system having a specific network identifier. This allows the computer to be interrogated as to its position, for example, in the event that the computer has inadvertently been given the same network identifier as another computer on the network. The computer or computers which respond with their position are the computer or computers with that network identifier.

In an embodiment, the network is a Local Area Network.

In another embodiment, the network is a Internet network or an Intranet network.

The invention also provides a method for determining the physical location of a computer system comprising the steps of: a remote computer requesting the computer system to provide its physical location; the computer system determining its physical position by means of a position determination system; and the computer system providing its physical position to the remote computer via a communications means.

The invention further provides apparatus for use with a control computer for physically locating one or more computers connected to a network, each of the one or more computers having a network address, the apparatus comprising: a position determination system located at each of the one or more computers for determining the physical position of the one or more computers; and communications means located at each of the one or more computers, responsive to a request from the control computer received via the network, for requesting the position determination system to provide a present physical location of the computer at which it is located and for providing the present physical location of the computer to the control computer via the network.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
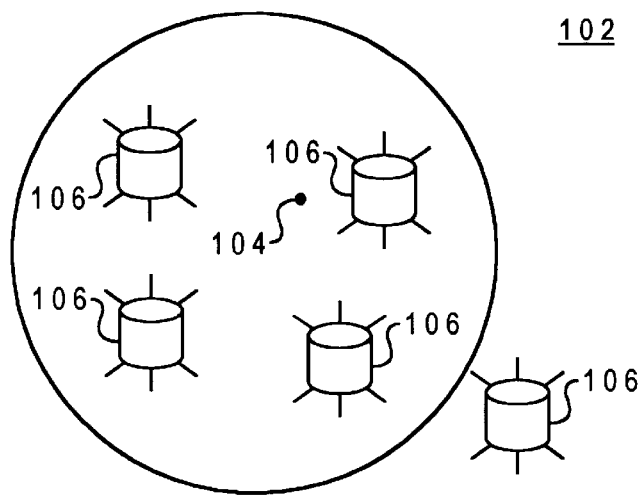
FIG. 1 is a partially schematic pictorial view of a global positioning system which may be utilized to implement the method and system of the present invention.

Referring firstly to FIG. 1, which is a partially schematic pictorial view of a global positioning system 102 which may be utilized to implement the method and system of the present invention. As illustrated, a computer 104 may be located, for example, in Greenock, Scotland.

Also depicted within global system 102 are a plurality of terrestrial satellites 106. The satellite network comprises a plurality of satellites 106 which may be implemented utilising several combinations of satellite systems. For example, the Global Positioning Satellite (GPS) system may be utilised. The details of the global positioning system are believed to be within the ambit of those having ordinary skill in this art and thus, the details of such a system form no part of this specification.

Figure 2:
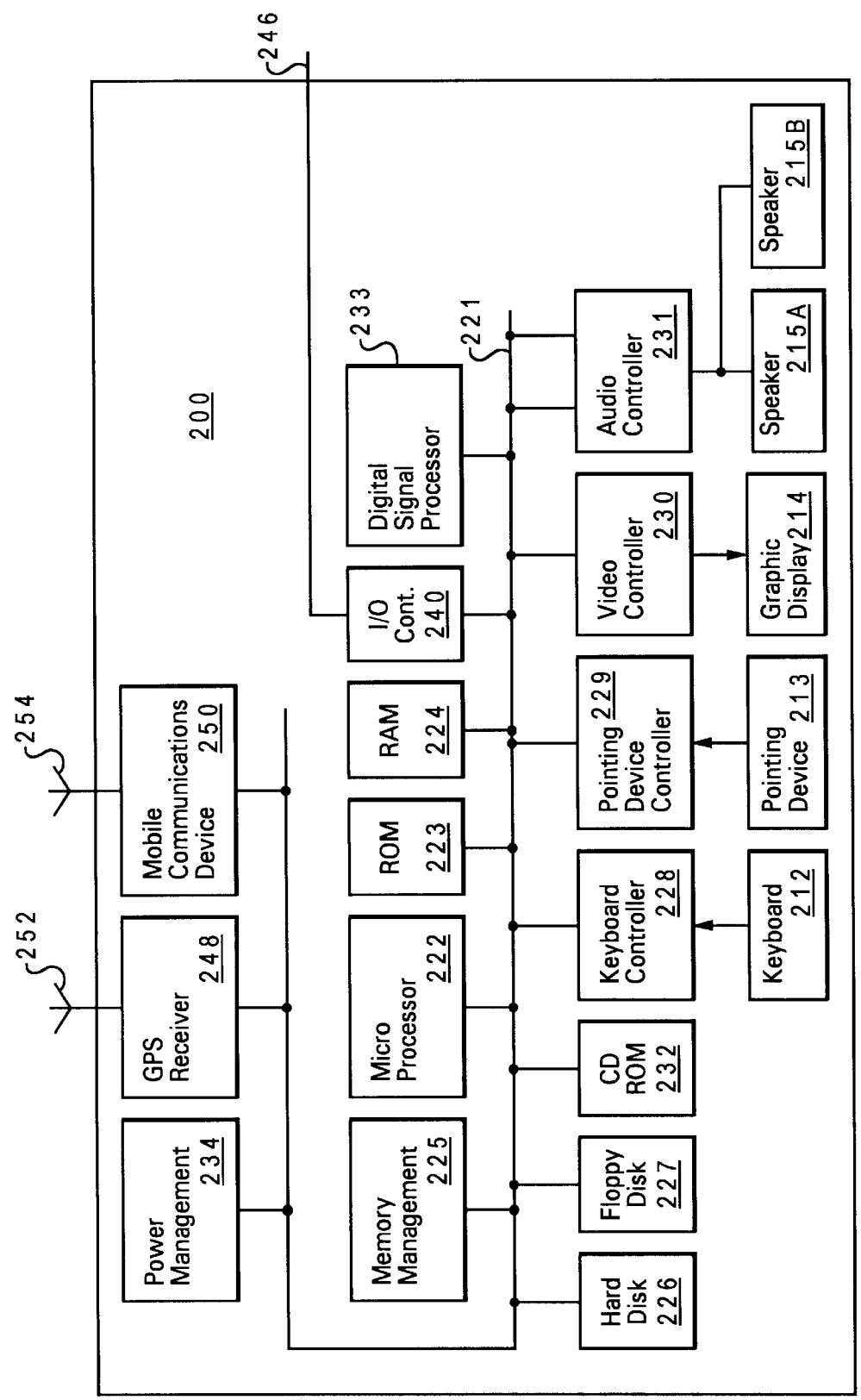
FIG. 2 is a block diagram of a portable computer according to the present invention.

FIG. 2 shows a portable computer 200 used in a first embodiment of the invention to aid recovery of a lost or stolen portable computer 200. The portable computer 200 comprises a keyboard 212, a pointing device 213 and a display 214 depicted in block diagram form. The portable computer 100 includes a system bus or plurality of system buses 221 to which various components are coupled and by which communication between the various components is accomplished. The microprocessor 222 is connected to the system bus 221 and is supported by read only memory (ROM) 223 and random access memory (RAM) 224 also connected to system bus 221. In many typical computers the microprocessors including the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 223 contains among other code the Basic Input-Output System (BIOS) which controls basic hardware operations such as the interaction between the CPU and the disk drives and the keyboard. The RAM 224 is the main memory into which the operating system and application programs are loaded. The memory management chip 225 is connected to the system bus 221 and controls direct memory access operations including, passing data between the RAM 224 and hard disk drive 226 and floppy disk drive 227. The CD ROM 232 also coupled to the system 221 is used to store a large amount of data, e.g. a multimedia program or presentation. CD ROM 232 may be an external CD ROM connected through an adapter card or it may be an internal CD ROM having direct connection to the motherboard.

Also connected to this system bus 221 are various I/O controllers: the keyboard controller 228, the pointing device controller 229, the video controller 230 and the audio controller 231. As might be expected, the keyboard controller 228 provides the hardware interface for the keyboard 212, the pointing device controller 229 provides the hardware interface for pointing device 213, the video controller 230 is the hardware interface for the display 214, and the audio controller 231 is the hardware interface for the speakers 215a and 215b. The power management controller 234 is connected to the system bus and receives power from a battery or from an external power supply which converts the ac voltage from a building supply to a predetermined lower dc voltage used to operate the portable computer 100. An I/O controller 240 such as a Token Ring adapter card enables communication over a network 246 to other similarly configured data processor systems. These I/O controllers may be located on the motherboard within the portable computer or they may be located on adapter cards or cartridges which plug into the motherboard. The adapter cards may communicate with the motherboard using a PCI interface, an ISA or EISA interface or other interfaces.

Also connected to the system bus 221 is a GPS receiver 248 with its associated antenna 252 and a mobile communications device 250 with its associated antenna 254. The GPS receiver 248 may be used, for example, in conjunction with routing software or with navigation software in order to indicate the computers location with respect to its surroundings. Routing software is commonly used to indicate to a user the most expeditious way in which to travel from the present location to another location. Navigation software, such as may be used in vehicles or on ships, allows the user to track the computers location with respect to for example, major roads or shipping lanes. The mobile communications device 250 may be used, for example, in conjunction with appropriate software, for the sending and receipt of voice calls, faxes and e-mail communications. The provision of such a facility either as a stand-alone mobile communications device 250 connected to a portable computer 200 or as a mobile communications device 250 integrated with a portable computer is well known in the art.

The GPS receiver 248 receives signals from the GPS satellites via the antenna 252 and uses these signals to determine the instantaneous location of the portable computer 200. The GPS receiver may operate continuously or it may operate periodically or it may operate only on demand, when triggered by, for example an incoming telephone call to the mobile communications device. In the event that it operates only on demand or is not operated over a period of time, the GPS receiver may take some time before it can provide location information. Once its location has been reestablished, then a continuous update of the location is available. The instantaneous location of the portable computer 200 may be expressed as longitude and latitude or it may be expressed in other coordinates, such as grid locations as are known for use in hand-held GPS receivers used by walkers and ramblers. Optionally, the location may include information relating to the altitude of the portable computer 200.

In the event of theft or loss of the portable computer 200, the owner of the portable computer 200, or an organisation or company responsible for the computer or providing a recovery service for the computer, may make contact with the portable computer using the mobile communications device 250 in the portable computer 200. When contact has been established, the mobile communications device 250 is requested to interrogate the GPS receiver 248 as to the current position of the computer in terms of latitude and longitude or other coordinates. The mobile communications device 250 then transmits this location information to the person making contact with the portable computer. The information may be transmitted as digital data or it may be transmitted as voice data if the portable computer includes a data to voice conversion facility.

If the portable computer 200 has been lost, the owner can now travel to the location provided from the portable computer and retrieve the computer. For example, if the portable computer has been left in a building or on public transport, the location, such as a lost property office, can be determined and the user can travel directly to that location. If the portable computer 200 has been stolen, then the owner can alert the relevant authorities, such as the police, as to the location of the portable computer 200 and the police can either travel to that location and recover the portable computer 200 or track the location of the portable computer 200 in order to apprehend the thieves.

The inclusion of a mobile communications device 250 in the portable computer 200 means that the portable computer 200 may report its position to the user or to another person and the present invention does not require that a tracking receiver be located close enough to be able to receive signals directly from the portable computer 200. Although the embodiment has been described with reference to a portable computer, the invention is equally applicable to non-portable computers, such as desktop computers and the like.

Figure 3:
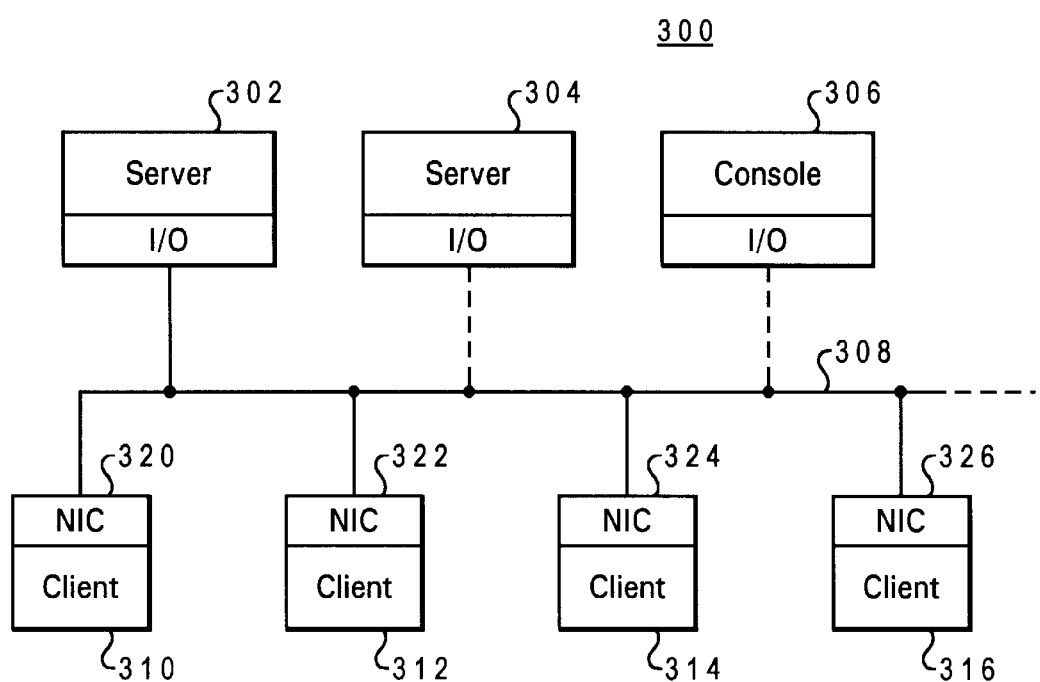
FIG. 3 is a schematic representation of a computer network according to a preferred embodiment of the present invention.

Referring to FIG. 3, there is shown, in schematic form, a local area network (LAN) 300 in which a second embodiment of the invention is implemented. The network of FIG. 3, which may be constituted as an Ethernet or Token-ring LAN or other arrangement, comprises a server computer system 302 connected for communication by a link 308, in a loop configuration, with a plurality of client computer systems 310, 312, 314, 316. The client computer systems may be personal computers based on the Intel X86 family of microprocessors or other forms of computer system including the Network Station from IBM. Each client system includes a LAN adapter card or network interface card (NIC) 320, 322, 324, 326 to provide communication with the server computer over link 308. Optionally, the network includes one or more further server systems 304 and a console computer system 306 through which the network administrator controls the network.

In a typical network, each of the client computer systems 310, 312, 314 and the server computer systems 302, 304 is given a network identifier. In a typical network, there may be many computers, perhaps hundreds or even thousands. FIG. 3 shows just three client computers, two server computers and a console computers for simplicity. In a typical network, the network identifier is a TCP/IP address and should be unique on the network. In the event that two computers are inadvertently given the same network identifier, one or both of the users of the computer will experience difficulties in using the computer as other computers with which it wishes to communicate will be unaware that another computer shares the network identifier. Another computer such as the console computer can discover the network identifier of each of the other computers on the network, but this is of no assistance in actually identifying the physical location of any of the other computers.

In the second embodiment of the present invention, at least some of the computers connected to the network, and preferably all of the computers connected to the network are equipped with a GPS receiver, such as the GPS receiver 250 shown in FIG. 2. In the event that two computers have inadvertently been given the same network identifier, then the console computer, or any of the server or client computers, can establish contact with one, both or all of the computers having the same network identifier. When contact has been established, the console computer can interrogate the GPS receiver 248 as to the current position of the computer in terms of latitude and longitude or other co-ordinates. The location information can then be transmitted over the network to the console computer, allowing the physical location of mobile communications device 250 to be established. In the event that a number of computers all have the same network identifiers, the position of these can be established one by one. Remedial action, such as the changing of the network identifier can then be completed.

The embodiments described above using the GPS system in order to determine position can sometimes provide restricted coverage when the GPS antenna is located within a building as the antenna may require a direct line of sight to the satellites. In a variation of the preferred embodiment, the position of the portable computer or of the computer connected to the network may be determined using cellular telephone cells. Such a variation does not require a direct line of sight to the transmitters and so can be used within a building wherever and whenever a cellular telephone may be used.

Such cells are widespread and it is possible to narrow down the location of the computer to within a 10 meter or a 50 meter radius, depending on the power level used for the cell. The user establishes contact with the communications means 250 and the information as to the cellular cells in which it is located is determined by the cellular telephone operating equipment and may be passed to the user or to a company offering the tracking service. The use of such a system is enhanced if the mobile communications means 250 uses a frequency band such that the same frequency is in use world-wide. Alternatively, the mobile communications means 250 may be capable of operating on two frequency bands, such as 900 MHz GSM and 1900 MHz USA or on 1800 MHz GSM and 1900 MHz PCN.

What is claimed is:

1. A computer system comprising:
   communication means for connection to a remote computer wherein the communications means comprises a cellular telephone communications device;
   a position determination system for determining the physical position of the computer system;
   wherein, if the computer system has been allocated the same network identifier as another computer, the communications means receives a request from the remote computer for the computer system to provide the physical position of the computer system to the remote computer system via the communications means; and wherein the request from the remote computer is sent by telephone to the computer system.

2. A computer system as claimed in claim 1 wherein the connection to a remote computer is a network and the request from the remote computer is sent using the network to a computer system having a specific network identifier.

3. A computer system as claimed in claim 2 wherein the network is a Local Area Network.

4. A computer system as claimed in claim 2 wherein the network is a Internet network or an Intranet network.

5. A computer system as claimed in claim 1 wherein the position determination system comprises a global positioning system receiver.

6. A computer system as claimed in claim 1 wherein the position determination system utilises cellular telephone communications cells.

7. A method for determining the physical location of two computer systems comprising the steps of:

a remote computer requesting via a network, a first computer system and a second computer system each having a same network identifier to provide their physical locations;

the first and second computer systems determining their physical positions by means of one or more position determination systems;

the first and second computer systems providing their physical positions to the remote computer via a communication means; and changing the network identifier of one of the first and second computer systems in response to the physical positions.

8. A method as claimed in claim 7 wherein the network is a Local Area Network.

9. A method as claimed in claim 7 wherein the network is a Internet network or an Intranet network.

10. Apparatus for use with a control computer for physically locating one or more computers connected to a network, each of the one or more computers having a network address, the apparatus comprising:

a position determination system located at each of the one or more computers for determining the physical position of the one or more computers; and communications means located at each of the one or more computers, responsive to a request from the control computer received via the network, for requesting the position determination system to provide a present physical location of the computer at which it is located and for providing the present physical location of the computer to the control computer via the network;

wherein the communication means receives a request from the control computer via the network for a first computer system and a second computer system, each having the same network identifier, to provide their physical positions to the control computer via the communication means, and in response, the control computer changing the network identifier of one of the first and second computer systems.

11. Apparatus as claimed in claim 10 wherein the network is a Local Area Network.

12. Apparatus as claimed in claim 10 wherein the network is a Internet network o r an Intranet network.

13. A computer system as claimed in claim 10 wherein the communications means comprises a cellular telephone communications device.

14. A computer system as claimed in claim 10 wherein the request from the remote computer is sent by telephone to the computer system.

15. A computer system as claimed in claim 10 wherein the position determination system comprises a global positioning system receiver.

16. A computer system as claimed in claim 10 wherein the position determination system utilizes cellular telephone communications cells.

\* \* \* \* \*